Dec. 20, 1966     M. I. ROSENBERG     3,293,535

VOLTAGE REGULATOR SYSTEM

Filed Feb. 14, 1964

INVENTOR:
MERTON I. ROSENBERG

BY *Howson & Howson*

ATTYS.

3,293,535
VOLTAGE REGULATOR SYSTEM
Merton I. Rosenberg, Springfield, Mass., assignor to American Bosch Arma Corporation, Springfield, Mass., a corporation of New York
Filed Feb. 14, 1964, Ser. No. 344,853
8 Claims. (Cl. 322—28)

This invention relates to voltage-regulated, alternating-current generator systems, and especially to closed-loop feedback regulators for use with alternating-current generators.

Generators of alternating current usually present the problem that the output voltage thereof, rather than inherently remaining constant, tends to change in response to a variety of uncontrollable factors such as speed of the prime mover, environmental temperature, load and power factor. To compensate for such tendencies for the output alternating voltage to vary, a large variety of regulator systems have ben proposed in the prior art, including a large class thereof in which a voltage-sensing circuit is utilized to derive a control signal indicative of variations of the output voltage from a desired value, which control signal is fed back in over-all degenerative phase to a control element on the generator, such as a field winding on a main generator or on an exciter if one is used. Such regulator systems themselves introduce certain additional problems, such as a tendency for the output voltage to hunt back and forth around the desired value rather than remaining completely constant, as well as transient effects of an undesirable nature which tend to occur upon abrupt changes in output voltage due to sudden load changes, for example. In order to provide simultaneously all of the desired characteristics of close voltage regulation, over-all stability, minimum hunting and satisfactory transient characteristics, suitable feedback regulators have tended to become more and more complex and expensive.

It is an object of the present invention to provide a new and useful automatic regulator system for regulating the output voltage of an alternating current generator.

Another object is to provide such a regulator system which, while providing close voltage regulation and good system stability, is nevertheless very simple and inexpensive relative to other systems producing comparable performance.

In accordance with the invention the above and other other objects are achieved by the provision of a system of the class in which a voltage-sensing circuit connected across a pair of output lines from an alternating-current generator develops a control signal which is fed back through an amplifier to a control winding of the generator system in such a phase as to oppose deviations of the output voltage from a desired value. The amplifier used in this feedback network is a simple saturable core reactor having an output winding connected in series with the generator control winding and having reactor control windings one of which is supplied with control signals derived by the voltage-sensing circuit. The output winding of the reactor and the generator control winding are connected in common series circuit with an asymmetrically-conductive device, across a pair of output lines of the generator system so that unidirectional pulses of current flow through the output winding and the generator control winding in series, the amount of current flowing through the generator control winding being determined by the impedance of the output winding of the reactor. The unidirectional nature of the curent pulses passed through the output winding of the reactor tend to maintain the reactor in a self-saturated condition for which the impedance of the output winding is low, so that a large current flows through the generator control winding. However a D.C. control signal applied to one of the reactor control windings by the voltage-sensing circuit is of a polarity to urge the reactor from its self-saturated state toward its unsaturated state, to an extent determined by the magnitude of the control signal. Accordingly, as the control signal fed back to the reactor is increased, the impedance of the reactor output winding also increases and the current through the generator field winding decreases. The voltage-sensing circuit is of such nature that the control signal produced thereby increases as the output voltage of the generator increases beyond a predetermined threshold level thereof, and the resulting changes in current through the saturable reactor amplifier and through the generator control winding are of such phase as to oppose the generator output voltage variation.

Further in accordance with the invention a voltage threshold device is disposed in series between the above-mentioned reactor control winding and a rectifier circuit in the voltage-sensing circuit, and it is of such polarity that appreciable current can flow through the reactor control winding only when the voltage from the rectifier, and hence only when the generator output voltage, rises above a predetermined threshold level, at which time a rapid change in the current through the reactor control coil occurs. The result is that high effective gain is provided in the feedback loop, producing close control of the generator output voltage.

Further in accordance with the invention, an inductor is disposed between the reactor control winding and the rectifier circuit, and has a reactance at the frequency of the output voltage of the generator which is sufficiently high to provide A.C. isolation between the reactor control winding and the rectifier circuit. Additionally, another asymmetrically-conductive device is connected effectively in parallel with the generator control winding in a polarity such as to damp out, and effectively remove, overshoot voltage pulses which tend to occur across the generator control winding in opposite polarity to those directly produced thereacross by the current pulses through the reactor output winding. An anti-hunt circuit is also connected between the generator control winding and another reactor control winding so as to feed back around the reactor, and in degenerative phase, signals which vary in proportion to the rate of change of voltage across the generator control winding, thereby to minimize hunting of the output voltage of the generator.

In a preferred form of the invention a variable resistance is also inserted in series with the rectifier so as to permit adjustment of the regulated operating point of the generator, and a temperature-compensating element such as a semi-conductor diode may be included in series with the control winding supplied from the rectifier circuit.

The above-described regulating system may also employ a load-sensing circuit of usual form for producing a load-sensing voltage which is supplied to an additional control winding on the reactor. However, it is a further feature of the invention in one of its aspects that tendencies for the output voltage of the generator to decrease with load may be compensated to a high degree by means of a special control winding on the saturable reactor which is connected in series with the output winding of the reactor and the generator control winding, and is arranged in regenerative relation on the reactor so as to provide a regenerative feedback around the reactor which is proportional to the current through the generator control winding.

The resultant system provides excellent regulation of the output voltage of the generator and satisfactory stability, despite substantial changes in the speed of the prime mover operating the generator, in temperature, and in load current and power factor of the load. At the same time it may be embodied in a particularly simple and inexpensive form. Thus the only sizable elements in the regulator circuit may be the saturable reactor, which may be in the form of a toroidal magnetic core having an output winding and a plurality of control windings; the inductor connected between the rectifier circuit and the main feedback control winding of the reactor; a further inductor, which is preferably utilized in the anti-hunt circuit; and a capacitor also in the anti-hunt circuit. Aside from this, the only elements which need be used to provide all of the above functions are a small variable resistor, three ordinary diodes an a zener diode, all of which may be small crystal diodes, and a bridge rectifier which is commercially available as a small cartridge containing four suitably-connected crystal diodes. Despite its simplicity and inexpensiveness, the regulator is readily capable of maintaining output voltage regulation within one percent, with good stability, despite the degree of variations in operating parameters which are normally encountered in ordinary use of such alternating-current generators.

Other objects and features of the invention will become more readily apparent from a consideration of the following detailed description taken in connection with the accompanying drawings, in which.

Figure 1:
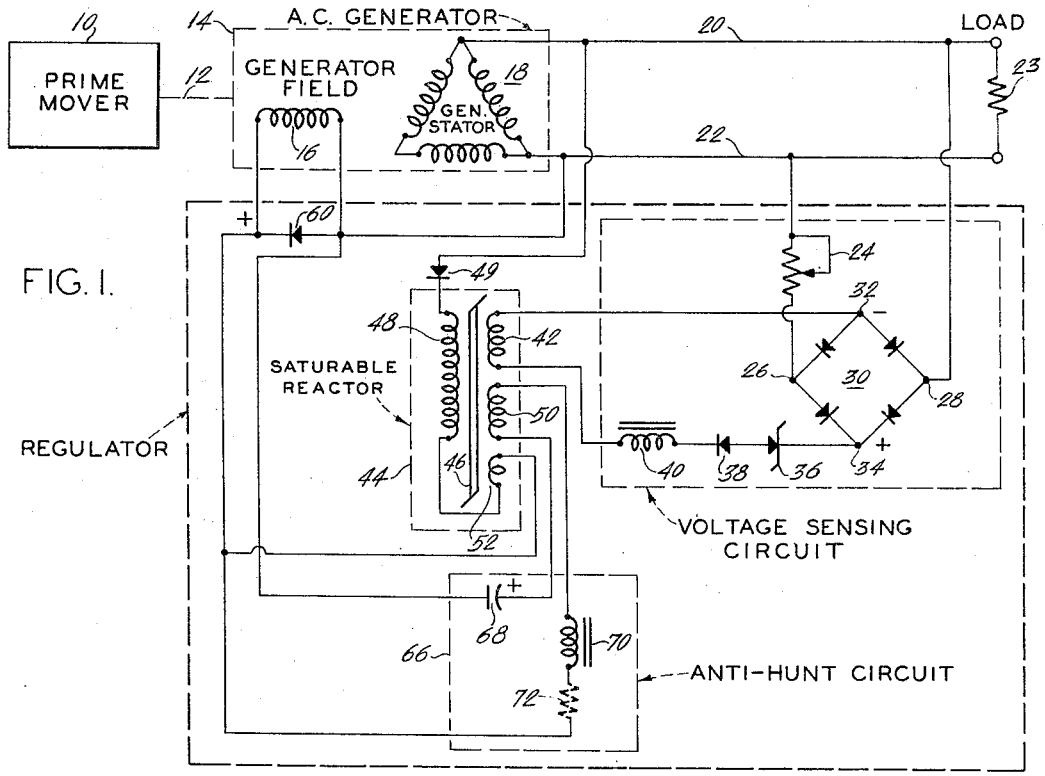
FIGURE 1 is an electrical schematic diagram illustrating one preferred embodiment of the invention.

Referring now to FIGURE 1, a prime mover 10, which may be of any form such as a gasoline engine for example, is mechanically connected by way of any suitable linkage 12 to drive A.C. generator 14. In this case the A.C. generator 14 is shown as comprising a generator field winding 16 and a generator stator winding arrangement 18, although it will be understood that the invention may be employed in connection with any of a large variety of A.C. generating systems so long as a pair of A.C. voltage output lines such as 20 and 22, and some form of generator control winding such as field winding 16, are provided, the current through the control winding such as 16 being effective to vary the magnitude of the alternating voltage between the output lines 20 and 22. In this example only two output lines are shown, together with a single load 23 connected across these lines, although in other applications more than two lines and more than one phase of output alternating voltage may be employed.

Output lines 20 and 22 are connected by way of variable resistor 24 to the two input junctions 26 and 28 of full-wave bridge rectifier 30, which bridge rectifier employs the usual arrangement of four diode elements whereby a full-wave rectified voltage is produced across bridge output junctions 32 and 34. The lower bridge junction 34, which is the positive terminal of the bridge, is connected by way of zener diode 36, ordinary semiconductor diode 38, inductor 40 and reactor control winding 42 to the upper, or negative, bridge junction 32. Zener diode 36 is operated as a voltage threshold device with its cathode directly connected to bridge output junction 34, whereby zener diode 36 is non-conductive when the output voltage of bridge 30 is below a predetermined threshold level but effectively breaks down to become highly conductive as soon as the output voltage of the bridge exceeds a predetermined threshold level. Normal semi-conductor diode 38 is forward-biased whenever zener diode 36 is conductive, so as to pass current readily, and serves primarily as a temperature stabilizing element by virtue of its reduction in forward resistance with increases in temperature, in well known manner. Inductor 40 has a reactance which is relatively high at the frequency of the alternating voltage produced by the A.C. generator, and therefore serves to supply reactor control winding 42 with a D.C. control current from which A.C. variations have largely been removed due to the smoothing action of the inductor. Inductor 40 serves a further important purpose in providing isolation between saturable reactor 44 and the voltage-sensing circuit, as will be described more fully hereinafter.

Saturable reactor 44 comprises a magnetic core 46, which may be of toroidal ring, having substantially rectangular-loop hysteresis characteristics, as is typically obtained by utilizing as the core material known alloys having equal amounts of nickel and iron. In addition to the main reactor control winding 42, saturable reactor 44 is provided in this example with an output winding 48, an anti-hunt control winding 50 and a load-booster control winding 52. The output winding 48 is connected in series with the asymmetrically-conductive diode 49, the load boosting winding 52, and the generator field winding 16, across the output lines 20 and 22 of generator 14. The alternating voltage at output lines 20 and 22 therefore produces unidirectional pulses of current through diode 49, output winding 48, load-booster control winding 52, and generator field winding 16. As described in more detail hereinafter, the magnitude of this unidirectional current depends upon the magnetic flux conditions in the core 46 of reactor 44, which in turn is determined by the currents through the reactor control coils 42, 50 and 52. An energy-absorbing damping diode 60 is connected in parallel with generator field winding 16 and serves to eliminate from across the generator field winding strong voltages of polarity opposite to that produced across winding 16 by the unidirectional current pulses passed therethrough by way of diode 49 and output winding 48.

An anti-hunt circuit 66 is also connected between generator field winding 16 and the anti-hunt reactor control coil 50, in this example comprising the capacitor 68 and inductor 70 connected in series with reactor winding 50, the inherent series resistance of the elements of this circuit being represented by the dotted-line resistor 72 which also appears in series with the control winding 50. Capacitor 68, inductor 70 and effective resistance 72 serve to prevent the feedback from the generator field winding to control coil 50 of direct current components, but are selected in accordance with known stability criteria to feed back to coil 50, in appropriate degenerative phase, anti-hunt control signals varying in accordance with the rate of change of the voltage across the generator field winding 16.

Figure 2:
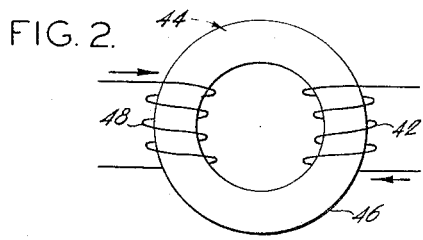
FIGURE 2 is a diagrammatic representation illustrating one possible form of an element of the embodiment of FIGURE 1.
Figure 3:
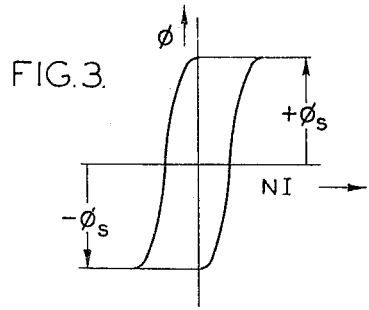
FIGURES 3, 4 and 5 are graphical representations to which reference will be made in explaining the invention.

Considering first in more detail the nature of the saturable reactor amplifier 44, as indicated in FIGURE 2 the core 46 of saturable reactor 44 may be a toroid of magnetic material having the substantially rectangular-loop hysteresis characteristics shown in FIGURE 3, in which figure abscissae represent ampere turns applied to the core by way of a winding thereon and ordinates represent magnetic flux intensity produced in the core. As shown in FIGURE 3, the core material saturates strongly for positive ampere turns at the flux value $+\phi_s$ and for negative ampere turns at the flux value $-\phi_s$, saturation occurring for a relatively low value of ampere turns of either polarity. Core materials having such characteristics are well known in the art, typically having a 50% nickel, 50% iron content.

It is characteristic of such a core that, when the ampere turns applied thereto by a coil thereon such as winding 48 are greater than that required to produce the saturation level of flux in the core, variations in the ampere turns are unable to produce any appreciable flux changes in the core and the effective self-inductance of the coil is substantially zero. Furthermore, where as in the arrangement of FIGURE 1 an A.C. voltage is applied to the winding 48 by way of a diode, the resultant unidirectional current pulses through the winding 48 produces a single polarity of ampere turns which operate to maintain the core in its saturation condition. Accordingly, in the absence of other magnetomotive forces applied to the core, the core 46 exhibits a very low reactance to the unidirectional current pulses. As a result, under these conditions in which no substantial currents are applied to the other control windings of the saturable reactor, substantially all of the voltage applied from the generator output lines 20 and 22 to the series combination of reactor output winding 48 and generator field winding 16 is developed across the generator field winding, and a high current flows therein. This high current corresponds to the current which occurs in the generator field winding when the output voltage of the generator is building up.

However, by applying to the core a direct magnetomotive force of the polarity to oppose the self-saturating flux produced in the core by winding 48, as by passing a direct current through winding 42 in the direction indicated by the arrow in FIGURE 2, there is provided for the core a variable magnetic bias which, as it increases, causes the flux variations due to the pulsating current in winding 48 to extend progressively farther into the unsaturated region of the magnetic characteristic of the core. It will be understood that while the core is in its unsaturated state, incremental changes in current in the output winding 48 are capable of producing corresponding substantial changes in the magnetic flux in the core, and hence the incremental inductance of winding 48 is large. In turn, when such a large incremental inductance exists in winding 48, most of the applied voltage from generator output lines 20 and 22 occurs across the reactor output winding 48, rather than across the generator field winding 16, and the current through the field winding is very low. Accordingly the average current through the generator field winding 16 is decreased greatly as the control current through the winding 42 is increased and, with a core of substantially rectangular hysteresis-loop characteristic, a relatively small increase in the current through the control winding 42 is capable of producing large changes in average current through the generator field winding 16, corresponding to a large current gain provided by the saturable reactor. As described previously, the current through the reactor control winding 42 is controlled by the voltage-sensing circuit shown in FIGURE 1.

Referring now to the voltage-sensing circuit in more detail, the full-wave bridge rectifier circuit 30 is of conventional form and hence need not be described in detail. It serves to respond to the alternating voltage between generator output lines 20 and 22 to produce, at the rectifier circuit output junctions 32 and 34, a direct control voltage proportional to the amplitude of the generator output voltage, the rectifier circuit output junction 34 being positive with respect to output junction 32. Zener diode 36 serves as a voltage threshold device which, for low output voltages of the rectifier circuit, prevents current flow through reactor control winding 42 because of the high reverse impedance of the zener diode 36. However, when the output voltage of the rectifier circuit 30 rises above a predetermined threshold level characteristic of the zener diode 36, the zener diode suddenly exhibits a low resistance in its reverse direction, this reverse resistance being so low that current flow through the zener is limited substantially entirely by the circuit resistance in series therewith. Since all current flowing through the zener diode must also flow through the variable resistor 24, the adjustment of resistor 24 determines the magnitude of the current through the zener diode produced for any given output voltage from the generator lines 20 and 22 in excess of the voltage required to break down the zener diode. Other voltage threshold devices, such as a gas tube for example, may be utilized in place of zener diode 36, but the zener diode has the advantage of being small, reliable and inexpensive.

Figure 4:
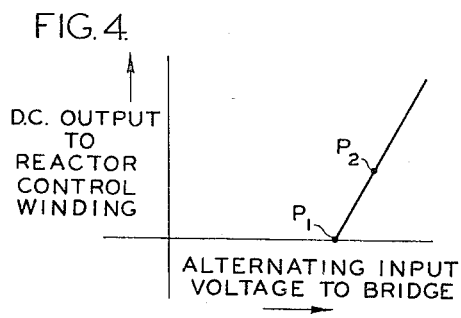

FIGURE 4 illustrates an idealized current-voltage characteristic of the voltage-sensing circuit, abscissae representing alternating input voltage to the bridge and ordinates representing direct current output to the reactor control winding 42. The graph illustrates that for alternating input voltages having amplitudes less than that corresponding to the abscissa of point $P_1$, substantially no output current is produced. Accordingly there is no negative feedback through the regulator to slow down the rise of output voltage as the generator is initially brought up to normal speed. However, for input voltages in excess of this value the output current rises very rapidly with input voltage, thus enhancing the gain of the regulator feedback loop. Point $P_2$ represents a possible operating point which may be produced when the generator output voltage is at its rated value, this point being adjustable by adjustment of variable resistor 24. When the generator output voltage tends to depart from rated value the operating point varies in position as the regulator operates to compensate for such tendencies.

The semi-conductor diode 38 is poled so as to have a low resistance when zener diode 36 conducts and thus does not interfere with the flow of D.C. current to the reactor control winding 42. However it does provide some forward resistance when conducting, which resistance inherently varies somewhat with temperature in a direction to compensate for changes of the resistance of the zener diode, when conducting, due to temperature changes, and hence serves as a temperature-compensating element.

The series inductor 40 in the voltage-sensing circuit serves to provide a low resistance to the D.C. component of the control current supplied to the reactor control winding 42 from the rectifier circuit 30, but at the same time has a sufficiently high reactance at the frequency of the generator output to provide strong A.C. isolation between control winding 42 and the other elements of the voltage-sensing circuit. This serves to prevent application to the remainder of the voltage-sensing circuit of alternating voltages induced across reactor control winding 42 through transformer action by the high A.C. voltage applied to reactor output winding 48, which induced voltages will tend to interfere with the normal action of the remainder of the voltage-sensing circuit, and prevents the flow of any substantial A.C. currents through the reactor control winding 42 in response to voltages induced by output winding 48, which would also upset system operation.

Considering now the nature of the anti-hunt circuit 66 in more detail, this circuit serves to supply a portion of the regulator output voltage produced across generator field 16 to reactor control winding 50 in a manner to enhance system stability and to minimize hunting in the output voltage of the generator. To accomplish this, anti-hunt circuit 66 includes in this case a capacitor 68 and an inductor 70 in series with anti-hunt control winding 50, as well as an effective resistance 72 due to resistance of elements connected in this series circuit, particularly the resistance of inductor 70. The values of the elements of the anti-hunt circuit are selected to provide an appropriate phase shift and circuit resistance for feeding back to winding 50 in proper phase and magnitude a current proportional to the rate of change of output voltage across generator field winding 16, as determined by the Nyquist criterion and other known servomechanism practices which need not be set forth in detail since they are known to one skilled in the art.

The asymmetrically-conductive device 60, which may be a simple crystal diode and is connected in parallel with the generator field winding 16, performs the following function. The diode 49 and the action of the saturable reactor 44 are such that the unidirectional current pulses produced in the generator field winding 16 terminate abruptly and, due to the inductance of the generator field winding 16, the voltage across the generator field winding then tends to overshoot in the opposite polarity thereby to produce a strong opposite-polarity pulse which, in the absence of diode 60, would be fed back to the saturable reactor and thence to varying degrees to all portions of the regulator feedback circuit to introduce unreliability and instability therein. The diode 60 prevents this by becoming conductive when the voltage across the generator field winding 16 overshoots into its opposite polarity condition.

With respect to the load boosting control winding 52 of saturable reactor 44, it is pointed out that a circuit like that of FIGURE 1 in which winding 52 is replaced by a short circuit is fully operative as an alternating current generator output voltage regulator. Such a system may also, if desired, include an additional control winding on the saturable reactor which is supplied in regenerative phase with a control signal derived by a load-sensing winding in series with one of the generator output lines, thereby to maintain optimum regulator efficiency despite substantial load changes.

Figure 5:
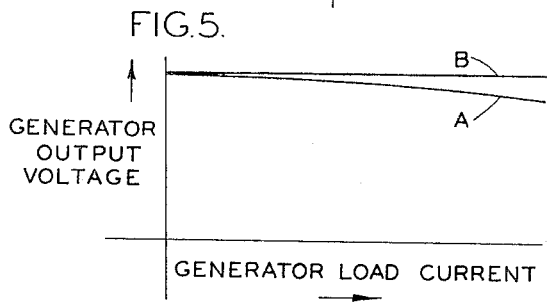

However, particularly in the form of circuit shown in FIGURE 1, reactor control winding 52 serves to provide excellent correction for a slight tendency of the generator output voltage to droop at high generator load currents. As shown by line A in FIGURE 5 for example, without the use of control winding 52 the generator output voltage tends to show a slight but appreciable droop in value with increasing load current. With coil 52 in the circuit this droop is substantially completely eliminated, as shown by the horizontal straight line B in FIGURE 5.

Winding 52 is wound in regenerative phase, i.e. so that increases in current through reactor output winding 48 and generator field 16 tend to be augmented by the flux changes in reactor core 46 produced by the current through winding 52. The result is in effect a regenerative feedback proportional to the current through the generator field winding. Thus, the greater the tendency for the generator output voltage to droop the greater is the compensating current produced through the generator field winding even without the additional coil 52, but the coil 52 serves further to increase this generator field current as the tendency for voltage droop occurs, thus providing the desired substantially complete compensation by which very close voltage regulation is achieved.

The transformer turns ratio between the output winding 48 and the control winding 52 of reactor 44 should be such that the voltage induced in the winding 52 from winding 48 by transformer action is negligibly small, as may be obtained by utilizing only a few turns of wire for winding 52. This permits the provision of maximally effective ampere turns of feedback by means of coil 52 without producing transformer-induced voltages which would interfere with the above-described operation.

By way of example only, in one application of the invention in which the alternating current generator operated at 60-cycle per second frequency, the reactor output winding 48 constitutes 1500 turns of No. 22 copper wire, winding 42 comprises 1000 turns of No. 33 copper wire, winding 50 comprises 300 turns of No. 33 copper wire and winding 52 constitutes 3 turns of No. 22 copper wire. Inductor 40 had an inductance of 4.5 henries and a resistance of 95 ohms provided by 1300 turns of No. 33 copper wire. Inductor 70 constituted 2100 turns of No. 32 copper wire, providing an inductance of 2.5 henries and a resistance of 65 ohms. Capacitor 68 had a capacity of 500 microfarads and a voltage rating of 50 volts. Diode 38 was a type 1N2069 crystal diode, diode 49 was a type 1N1126 crystal diode, and diode 60 was a type 1N2069 crystal diode. Voltage regulation was obtained which was as good as, or superior to, that provided by much more expensive and bulky regulators.

While the invention has been described with particular reference to specific embodiments thereof in the interests of complete definiteness, it will be understood that it may be embodied in any of a large variety of forms diverse from those specifically described without departing from the spirit and scope of the invention as defined by the appended claims.

I claim:
1. A regulated alternating-voltage generator system, comprising:

alternating-voltage generating means having at least a pair of output lines for developing an alternating voltage across said lines, and having a winding responsive to changes in current through it to vary the magnitude of said alternating voltage;

a saturable reactor comprising a saturable magnetic core having thereon an output winding and control windings;

a first asymmetrically-conductive device and means connecting said output winding and said generator winding in common series circuit with said first asymmetrically-conductive device across said pair of output lines of said generator, thereby to produce through said generator winding and said output winding unidirectional pulses of current tending to operate said reactor in its self-saturated state;

a voltage-sensing circuit connecting one of said control windings across said output lines of said generator for deriving and applying to said one control winding a direct-current control signal having an intensity varying in accordance with the magnitude of said alternating voltage when said alternating voltage is above a predetermined level and having a polarity increasingly to oppose the magnetizing force applied to said core by said output winding as said control signal increases;

said voltage-sensing circuit including a rectifier circuit for converting alternating voltage supplied thereto from said output lines to direct voltage, an inductor connected between said rectifier circuit and said one control winding for applying said direct voltage to said one control winding, said inductor having a reactance at the frequency of said alternating voltage sufficient to provide alternating-voltage isolation between said rectifier circuit and said one control winding, and a voltage threshold device connected between said rectifier circuit and said one control winding and poled so as to present a high impedance to the flow of current from said rectifier circuit to said one control winding when the voltage from said rectifier circuit is below said threshold level and to become highly conductive when said last-named voltage exceeds said threshold level;

a second asymmetrically-conductive device connected in parallel with said generator winding for damping overshoot-voltages which tend to occur across said generator winding following each of said pulses of current therethrough; and an anti-hunt circuit connected between said generator control winding and another of said control windings for applying to said other control winding in degenerative phase a current varying in accordance with the rate of change of voltage across said generator control winding.

2. A system in accordance with claim 1, comprising a further control winding on said core connected in series with said output winding and of a polarity to decrease the impedance of said output winding in response to increases in current through said output winding.

3. A system in accordance with claim 2, in which said further control winding has a number of turns many times less than the number of turns of said output winding.

4. A system in accordance with claim 1 in which said first and second asymmetrically-conductive devices each comprise a diode rectifier and said voltage threshold device comprises a zener diode.

5. A system in accordance with claim 1, in which said anti-hunt circuit comprises a capacitor and an inductor in series with said other control winding.

6. A system in accordance with claim 1, comprising also a temperature-sensitive diode in series with said inductor and said voltage threshold device to provide temperature compensation for said system.

7. A voltage regulator for an alternating-current generator having a pair of output lines across which an alternating output voltage is produced and having a winding responsive to current through it to vary said output voltage, said regulator comprising:

a saturable reactor comprising a saturable magnetic core having thereon an output winding and control windings;

a first asymmetrically-conductive device in common series circuit with said output winding;

connections for connecting said series circuit between a generator output line and a generator control winding;

a voltage-sensing circuit responsive to alternating voltage of more than a predetermined value to apply a direct control current to one of said reactor control windings, said voltage sensing circuit comprising a rectifier circuit and an inductor connected to provide A.C. isolation between said rectifier circuit and said one control winding and also comprising a voltage threshold device connected between said rectifier circuit and said one control winding to permit application of voltage to said one control winding from said rectifier circuit only when the output voltage of said rectifier circuit exceeds a predetermined threshold value;

a second asymmetrically-conductive device and connecting means for connecting said second asymmetrically-conductive device in parallel with said generator control winding; and an anti-hunt circuit for applying to another of said reactor control windings a current varying in degenerative phase in accordance with the rate of change of voltage across said generator control winding.

8. A regulator in accordance with claim 7, comprising a further control winding on said reactor and connected in series with said output winding in a polarity to decrease the impedance of said output winding in response to increases of current through said further control winding.

References Cited by the Examiner

UNITED STATES PATENTS

| | | | |
|---|---|---|---|
| 2,374,012 | 4/1945 | Hanna | 322—75 X |
| 2,853,674 | 9/1958 | Gallatin | 322—58 |
| 2,874,346 | 2/1959 | Orvis | 322—75 X |
| 3,161,817 | 12/1964 | Carlson | 322—28 |
| 3,204,173 | 8/1965 | Jackson | 322—28 |

FOREIGN PATENTS

| | | |
|---|---|---|
| 518,549 | 2/1940 | Great Britain. |
| 1,156,159 | 10/1963 | Germany. |

MILTON O. HIRSHFIELD, *Primary Examiner.*

J. J. SWARTZ, *Assistant Examiner.*